Figures 1, 2:
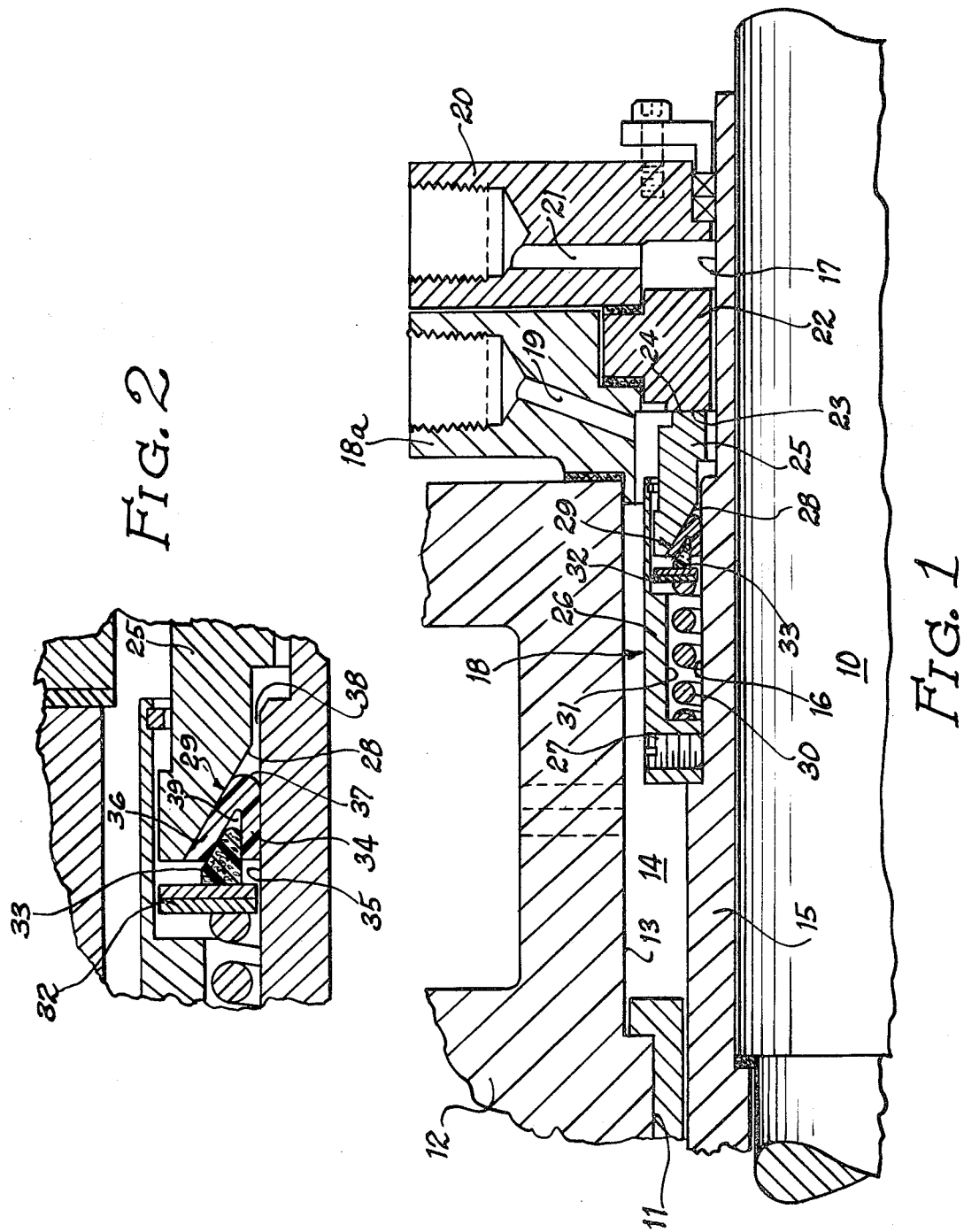

United States Patent
Tankus

[11] 3,722,896
[45] Mar. 27, 1973

[54] SECONDARY SEAL FOR ROTARY MECHANICAL SEAL

[75] Inventor: Harry Tankus, Wilmette, Ill.

[73] Assignee: Crane Packing Company, Morton Grove, Ill.

[22] Filed: Mar. 19, 1971

[21] Appl. No.: 126,030

[52] U.S. Cl..................................277/87, 277/190
[51] Int. Cl. ...............................................F16j 15/34
[58] Field of Search........277/87, 85, 190, 41, 84, 86, 277/93 R

[56] References Cited

UNITED STATES PATENTS

| 3,152,808 | 10/1964 | Tankus et al. | 277/87 X |
| 3,015,506 | 1/1922 | Tracy | 277/87 X |
| 3,297,331 | 1/1967 | Tracy | 277/87 X |
| 2,844,393 | 7/1958 | Jensen | 277/87 |

Primary Examiner—Samuel B. Rothberg
Attorney—Charles F. Voytech

[57] ABSTRACT

The invention resides in a secondary seal of polytetrafluoroethylene for a rotary mechanical shaft seal. The novel secondary seal replaces and is interchangeable with a known secondary seal also made of polytetrafluoroethylene which has a wedge shape in radial cross section and which causes fretting over the portion of the shaft contacted by the apex of the wedge. The novel secondary seal is somewhat V-shaped or folded in radial cross section and presents the rounded bottom of the fold to the shaft to produce a rolling action of the secondary seal on the shaft instead of the sliding, fretting-producing wedge action of the wedge-shaped secondary seal.

5 Claims, 2 Drawing Figures

Patented March 27, 1973

3,722,896

INVENTOR
Harry Jankus
by Charles F. Voytech
Atty

SECONDARY SEAL FOR ROTARY MECHANICAL SEAL

This invention relates to secondary seals for rotary mechanical shaft seals or the like.

In many manufacturing processes, it is necessary to pump liquids the temperatures of which are higher than those which can be safely handled by seals made from the ordinary elastomers. For these higher temperatures it has been proposed to use rotary mechanical seals the secondary seal of which is in the form of a ring of polytetrafluoroethylene the radial cross section of which is in the form of a wedge. The sealing washer used with the wedge has a sloping wall which, with the cylindrical surface of the shaft or other device on which the seal is mounted, creates an annular cavity the radial cross section of which is likewise wedge-shaped. The secondary seal between the washer and shaft is effected by forcing the apex of the polytetrafluoroethylene ring into the small clearance space between the washer and shaft, the force for this action being derived from one or more axially acting springs. One such seal is shown in Tankus et al. U.S. Pat. No. 3,152,808 granted Oct. 13, 1964.

Although the polytetrafluoroethylene wedge-shaped rings of the prior art have been very successful as secondary seals for rotary mechanical shaft seals, it has been noted that where there is a mis-alignment between the rotary and stationary members of the mechanical seal, a vibration is produced between the washer and shaft, and that the vibration is transmitted to the shaft through the apex of the secondary seal ring. This vibration creates a rapid and continuous rubbing action between the polytetrafluoroethylene and the shaft which results in "fretting" of the shaft, that is, the shaft is worn in an irregular fashion which in time causes a leak past the apex of the ring and destroys the effectiveness of the rotary mechanical seal as a whole.

It is an object of this invention to provide a secondary seal ring for a rotary mechanical seal, said seal ring being made of polytetrafluoroethylene and being interchangeable with the wedge-shaped polytetrafluoroethylene ring of the prior art, said novel ring being so constructed as to substantially eliminate fretting of the shaft by said ring.

Another object of this invention is the provision of a secondary seal made of polytetrafluoroethylene for use in rotary mechanical seals normally utilizing an endless ring of polytetrafluoroethylene which has a substantially wedge-shaped cross section, wherein the apex of the ring has been eliminated so as to eliminate the cause of the fretting of the shaft heretofore noted in connection with the use of said prior art wedge-shaped secondary seals.

These and other objects of this invention will become apparent from the following detailed description of a preferred embodiment of the invention when taken together with the accompanying drawings in which:

FIG. 1 is a quarter-section through a rotary mechanical seal and surrounding pump structure wherein the seal utilizes the secondary seal of this invention; and FIG. 2 is an enlarged view of that portion of FIG. 1 showing the novel secondary seal and its disposition in the rotary mechanical seal.

By way of general description, I have found that the fretting of the shaft caused by the wedge-shaped polytetrafluoroethylene secondary seal can be eliminated by changing the shape of the secondary seal in a manner to alter completely its action when in use. Instead of a rigid cross-sectional shape which compels a sliding movement of a secondary seal into and out of the small clearance space between the sealing washer of this seal and the shaft adjacent thereto, the secondary seal of the present invention has a radial cross section in the form of a V which has a rounded surface at the apex, said surface being completely removed from the clearance space between the washer and shaft. There is therefore no sliding of the wedge into the clearance space and no pinching effect created upon the apex of the secondary seal by the action of the washer relative to the shaft when the washer and shaft are not in perfect alignment and hence the cause of the fretting heretofore noted is eliminated.

In place of the wedge apex heretofore relied upon to provide the seal between the washer and shaft, the diverging sides of the V-shaped secondary seal ring are utilized to prevent leakage between the sealing washer and shaft. To this effect the walls of the V are made deformable and a solid ring is inserted between the walls of the V. The solid ring is urged into the space between said walls by one or more springs so that the rigid ring tends to spread the walls of the secondary seal against the tapered surface of the sealing washer and the cylindrical surface of the shaft. Sufficient force is applied by the solid ring to compel the walls of the V to conform to the shape of the sealing washer and shaft.

With the V-shaped secondary seal, vibration between the sealing washer and shaft is converted into a form of universal movement of the walls of the V relative to one another without creating a material amount of sliding action therebetween such as would result in fretting of either the shaft or the sealing washer surfaces contacted thereby.

Referring now to the drawings for a detailed description of the invention, there is shown a shaft 10 which passes through a opening 11 in a housing 12 for a pump, or the like, said housing having a counterbore 13 forming with shaft 10 a seal chamber 14. Said chamber 14 is reduced by a sleeve 15 having steps 16 and 17 for supporting a rotary mechanical seal shown generally at 18.

In the example illustrated seal chamber 14 is closed by a cover plate 18a which may be provided with a passage 19 through which a cooling fluid may be circulated, and there may be provided further a second cover plate 20 having a passage 21 in communication with step 17 through which other fluid may be circulated for various purposes such as additional cooling or to provide a higher pressure on the exterior of seal 18 to prevent the leakage of any corrosive or noxious fluid that might be handled by the pump. The specific forms of end plates 18 and 20 are not material to this invention and hence will not be described in further detail.

Seal 18 is of the rotary mechanical end face type and is comprised essentially of a stationary seal member 22 clamped between plates 18a and 20 and provided with a radially disposed flat and smooth surface 23 against which a similarly flat and smooth surface 24 of a sealing washer 25 is adapted to run with a fluid-tight fit.

Said sealing washer 25 is disposed within a retainer 26 secured for rotation with sleeve 15 by a set serew 27. Means (not shown) of the type disclosed in the aforesaid Tankus et al. patent 3152808 are provided for compelling washer 25 to rotate with retainer 26.

The end of sealing washer 25 opposite surface 24 is formed with a sloping or frusto-conical surface 28 which, with the external surface 35 of step 16 on sleeve 15, forms a wedge-shaped opening between washer 25 and step 16. In said opening is located a secondary sealing ring 29 made of polytetrafluoroethylene, said ring being urged into the wedge-shaped opening and against sloping surface 28 by a spring 30 disposed in a counterbore 31 in retainer 26. Said spring 30 presses against a metal washer 32 which bears against a solid wedge ring 33 to transmit the spring pressure to ring 29.

As shown more clearly in FIG. 2, ring 29 is essentially of V-shape in radial cross section and has a side 34 overlying the outer surface 35 of step 16, a side 36 which overlies the sloping surface 28 on washer 25, and a rounded apex 37 facing the clearance 38 between washer 25 and surface 35.

It may be noted that rounded surface 37 is located some distance away from clearance space 38 even when under pressure of spring 30 so that at no time does any portion of secondary sealing ring 29 enter into the clearance space 38.

Sides 34 and 36 form a wedge-shaped space 39 between them into which is inserted solid wedge ring 33 previously mentioned as transmitting spring pressure to ring 29.

With the construction of ring 29 as shown in FIG. 2, any misalignment between surface 23 on ring 22 and the axis of shaft 10 resulting in a periodic vibration of sealing washer 25 relative to sleeve 15 will be taken by secondary sealing ring 29 in a manner to move side 36 thereof relative to side 34 rather than to pinch any portion of the apex of ring 29 between washer 25 and surface 35 in the clearance space 38 as was the case with the prior art secondary sealing ring. Such movement of the sides 36 and 34 of secondary sealing ring 29 relative to one another may cause a flexing of the material of ring 29 at is apex, but such flexing is well within the capabilities of polytetrafluoroethylene in the configuration shown and hence causes no undo wear of either surface 35 or surface 28. The life of the seal therefore is increased, thereby effecting an economy in the replacement of the seal itself and in the reduction of down time of equipment associated with seal 18.

The V-shaped section of ring 29 provides greater freedom of movement of the washer 25 relative to sleeve 15 and in particular permits it to approach a universal movement relative to said sleeve 15 under conditions of misalignment of the surface 23 and shaft axis. Such universal movement is not possible with a solid wedge secondary seal ring, nor is it possible with a U-shaped section ring since in both these cases, the material is compressed between concentric cylindrical surfaces on the washer and shaft, and the material is too stiff to yield periodically to such compression.

It is contemplated that sides 36 and 34 will be of a thickness readily permitting deformation of said sides to conform to the shapes of the surfaces 28 and 35 of washer 25 and step 16, respectively, so that under the pressure available from spring 30, an effective fluid-type seal will be created at all times between washer 25 and step 16.

It is intended that any sliding action which is created by vibration of washer 25 relative to step 16 will be taken by the rigid wedge ring 33. For this reason it is desirable that the coefficient of friction between the contacting surfaces of rings 33 and 29 be relatively low, preferably lower than that existing between ring 29 and washer 25 as well as ring 29 and surface 35. Such desirably lower coefficient of friction can be obtained by making wedge ring 33 of glass-filled polytetrafluoroethylene the composition of which is well known. The lower coefficient of friction between ring 33 and ring 29 therefore insures the desirable universal action between ring 25 and step 16 and a longer life for ring 29 resulting from the absence of sliding movement between said ring 29 and surfaces 28 and 35 contacted thereby.

I claim:

1. In a rotary mechanical seal for relatively rotatable elements, the combination of a rigid sealing washer loosely surrounding one of said relatively rotatable elements, said washer having a sloping wall adjacent said one of said relatively rotatable elements and forming an annular clearance space between the washer and said one of said relatively rotatable elements, said sloping wall forming an annular cavity of wedge-shaped radial cross section with said one of said relatively rotatable elements wherein the annular clearance space is at the apex of the annular cavity, an annular flexible sealing element disposed in said cavity, said sealing element having walls which are substantially parallel with the walls of said cavity, and a rounded apex connecting said sealing element walls and forming a "V" with said walls, and means urging one of said sealing element walls against the sloping wall of the sealing washer and the other of said sealing element walls against the said one relatively rotatable sealing element to form a fluid-tight seal therewith, said rounded apex being spaced from and urged toward said annular clearance space.

2. The combination described in claim 1, said annular flexible sealing element being made of polytetrafluoroethylene.

3. The combination described in claim 1, said annular flexible sealing element being made of polytetrafluoroethylene and said means urging one of said sealing element walls against the sloping wall of the sealing washer comprising a ring of glass-filled polytetrafluoroethylene.

4. The combination described in claim 1, said one of said relatively rotatable elements being cylindrical in external contour and said rigid washer surrounding said one of said relatively rotatable elements having a circular opening through which said one of said relatively rotatable elements passes and which forms the aforesaid annular clearance space between the washer and said one of said relatively rotatable elements, no part of said annular flexible sealing element extending into said clearance.

5. The combination described in claim 1, said annular flexible sealing element being made of polytetrafluoroethylene, and said means urging one of said sealing element walls against the sloping wall of the sealing washer comprising a ring of wedge-shaped radial cross section having a frustrated apex to leave a space between the ring and the rounded apex of the sealing element, said ring having a low coefficient of friction with respect to the walls of the element contacted thereby such that misalignment between the axis of the washer and the axis of the said one of said relatively rotatable elements results in a universal movement of the walls of said sealing element with reference to one another.

* * * * *